United States Patent [19]
Siryk

[11] Patent Number: 5,280,321
[45] Date of Patent: Jan. 18, 1994

[54] DUAL ROLL ROTARY MICROFILMER FOR 25X REDUCTION OR LESS

[75] Inventor: Walter J. Siryk, Rochester, N.Y.

[73] Assignee: Eastman Kodak Company, Rochester, N.Y.

[21] Appl. No.: 941,834

[22] Filed: Sep. 8, 1992

[51] Int. Cl.$^5$ .................. G03B 27/32; G03B 27/52
[52] U.S. Cl. ............................................. 355/23
[58] Field of Search .................................... 355/23

[56] References Cited

U.S. PATENT DOCUMENTS

| | | | |
|---|---|---|---|
| 2,194,808 | 3/1940 | Pooley | 355/23 |
| 2,552,266 | 5/1951 | Egan et al. | 355/24 |
| 2,578,320 | 12/1951 | Schubert | 88/24 |
| 2,787,190 | 4/1957 | McWhirter et al. | 88/24 |
| 3,212,399 | 10/1965 | Walter | 355/24 |
| 3,320,853 | 5/1967 | Froese | 355/23 |
| 3,885,871 | 5/1975 | Galatha et al. | 355/23 |
| 4,734,742 | 3/1988 | Klumpp et al. | 355/23 |
| 5,208,627 | 5/1993 | Yoshihara et al. | 355/23 |

FOREIGN PATENT DOCUMENTS

| | | | |
|---|---|---|---|
| 492229 | 4/1953 | Canada | 88/24 |
| 545970 | 9/1957 | Canada | 88/24 |
| 665992 | 2/1952 | United Kingdom | 88/24 |

*Primary Examiner*—Richard A. Wintercorn
*Attorney, Agent, or Firm*—Dennis R. Arndt

[57] ABSTRACT

A 16 mm rotary microfilmer that operates in 25× duplex mode that simultaneously photographs both sides of a document. Each side of the document is imaged onto a separate roll of film resulting in greater resolution and easier readability. The microfilmer gives the same numerical address to the images of each side of the document so that the images of the front and rear of the document are easily mated to each other and identified as a single document to reduce confusion in the retrieval process.

9 Claims, 5 Drawing Sheets

DUAL ROLL ROTARY MICROFILMER FOR 25X REDUCTION OR LESS

FIELD OF THE INVENTION

The present invention relates to the photographic copying of documents and more particularly to a rotary microfilmer that simultaneously photographs both sides of a document at a reduction ratio of 25× or less onto 16 mm film. Each side of the document is imaged onto a separate roll of film.

BACKGROUND OF THE INVENTION

Currently, there are 16 mm rotary microfilmers that capture document images on film of both sides (duplex operation) at reductions of 42× or 50× or even greater reductions. Both sides of the document are filmed side by side on the same roll of film. However, at a reduction of 25× or less, both sides of the document image cannot fit side by side onto 16 mm film. Currently, at this reduction, microfilmers capture one side of a document only (simplex operation). The document must be turned over after the first filming and refed in order to record both sides of the document. Because of the large volumes of documents involved, this becomes very labor intensive and susceptible to operator error.

Because many organizations microfilm documents containing very small characters or symbols and to insure readability upon retrieval, a higher resolution 25× lens is used.

Canadian Pat. No. 545,970 entitled "Apparatus for Photographically Copying Both Sides of a Document" discloses the photographing of both sides of a document simultaneously, side by side onto two rolls or one wide roll of microfilm. The use of two rolls provides a duplicate copy. The document is advanced through a photographing station where both sides are illuminated by a separate set of lamps. Both sides of the document are then imaged onto a photosensitive medium by three lenses and a mirror system. The disadvantage of such a system is that it is limited by the optical reduction ratio. The reduction ratio must be equal to or greater than a reduction ratio that will allow front and rear images when placed next to one another to be narrower than the width of the film usually 16 mm. Accordingly, one is limited to a reduction ratio of 42× for 16 mm film format. By using three lenses, this system is limited by the document width that will fit next to each other when imaged on a single roll of film.

U.S. Pat. No. 3,885,871 entitled "Document Photography System" illustrates a system where both sides of a document are photographed simultaneously with images thereof placed in side by side relationship onto a roll of film in which the width of the document is sensed and the film motion is incremented by amounts proportional to the indicated width of the documents. With such a system, documents of unlimited width may be photographed. Once again, the disadvantage is the same as described in the previous patent. The optical reduction ratio is once again the limiting factor. The reduction ratio must be such that the combined size of the images of both sides of the document in the "across the film" or "cross track" direction are smaller than the width of the photosensitive media.

SUMMARY OF THE INVENTION

Therefore, an object of the present invention is to provide a rotary microfilmer capable of simultaneously photographing both sides of a document with an image of each side on a different roll of film at a low reduction ratio, thereby providing greater resolution and easier readability.

Another object of the invention is to provide a rotary microfilmer capable of simultaneously photographing both sides of a document so that the image of each side is placed on a different roll of film at low reduction ratios. Such a procedure significantly reduces the amount of time, labor and specialized sorting equipment required.

Another object of the invention is to provide a rotary microfilmer capable of identifying by numerical address the images of both sides of a document photographed onto different rolls of film at low reduction ratios thereby making the images easier to identify and retrieve.

Another object of the invention is to provide a rotary microfilmer capable of preventing errors involved in the currently used two-step process involved in photographing both sides of a document at a low optical reduction ratio.

The invention provides that in a document photography system for simultaneously photographing on photographic film both front and rear sides of rectangular documents traveling serially and end-to-end, said system comprises means for conveying documents to be photographed past a photographing station and an exposure station. A first set of fixed mirrors are aligned to reflect the image of the front side of one of said documents to be photographed to a first reduction lens system. A second set of fixed mirrors are aligned to reflect the image of the reverse side of the document to be photographed to a second reduction lens system. The first and second reduction lens systems projecting their respective images on a first and second film surfaces in first and second film rolls. There is an advancing means for moving the first and second film surfaces at a synchronous rate with respect to the conveying means for movement of the document past the exposure station at a selectively increased synchronous rate with respect to the movement of the document. The control means is operatively connected to said advancing means permitting said first and second film surfaces to be moved at an increased synchronous rate with respect to the movement of the document.

DESCRIPTION OF THE PREFERRED EMBODIMENT

Figure 1:
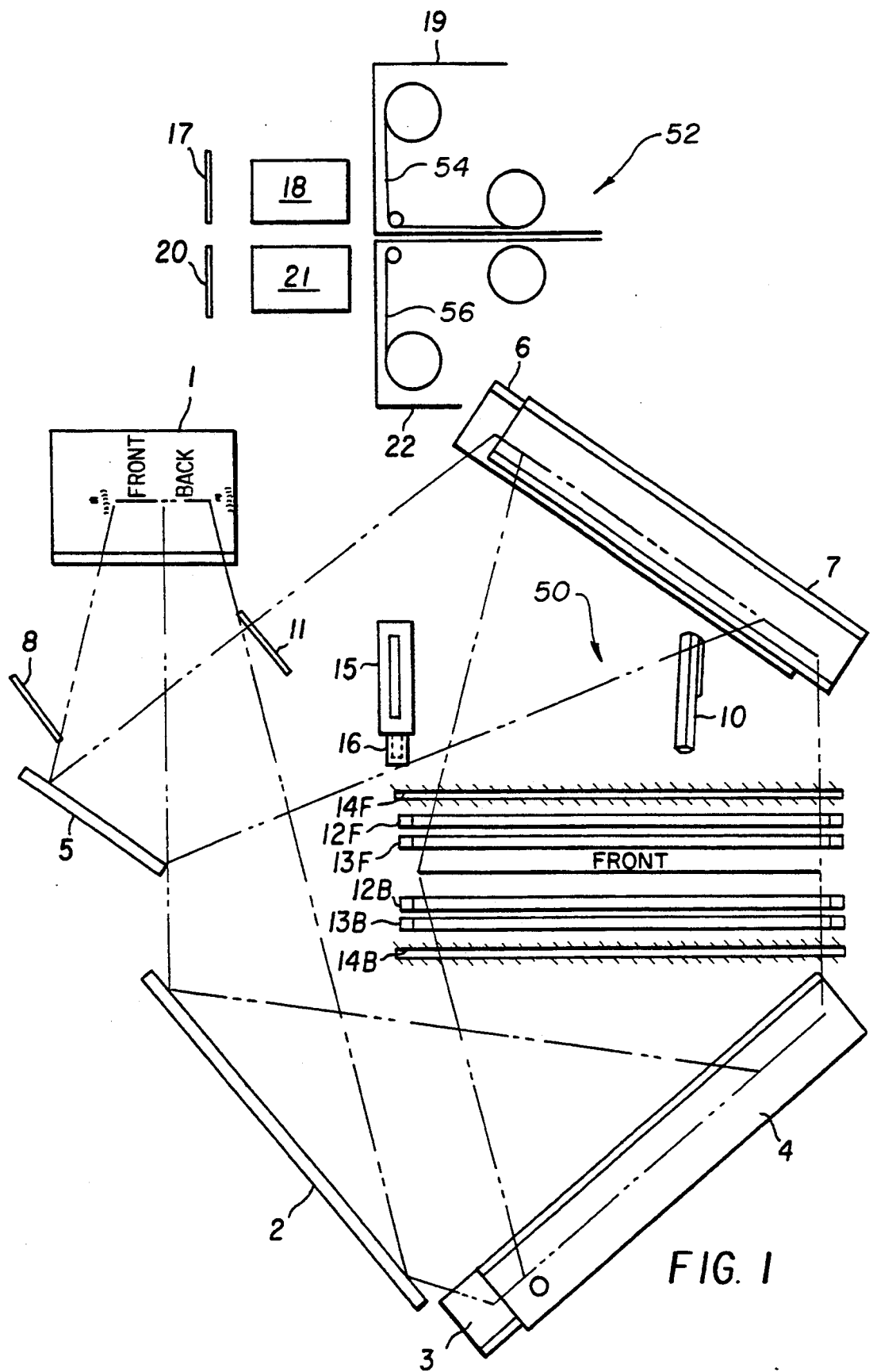
FIG. 1 is a schematic illustration showing the general configuration of a preferred embodiment of the invention.

Referring to FIG. 1, there is shown in schematic form a document photography system embodying the present invention. Documents are serially transported by means not shown in succession along their longest dimension. The transport system includes an automatic exposure control system and a document sensor. The automatic exposure control adjusts the light level of the exposure lamps according to document tone. The document sensor and control circuit circuitry detect the leading and trailing edges of the document and activate other components such as the film drive system. The film is advanced only when a document is being photographed. This allows for the consistent spacing of document images which reduces film waste and provides a uniform film format. This consistent spacing remains constant regardless of the length of the document being filmed; with any document length being capable of being photographed.

The imaging station 50 comprises four cylindrical fluorescent lamps 12F, 12B and 13F, 13B and two slit apertures 14F, 14B and other components not shown, but are well known in the art and considered part of the document transport system (such as documents guides, belts, rollers, document sensors, and automatic exposure control system). Components 12F, 13F and 14F are used to photograph the front of the document while components 12B, 13B and 14B are used to photograph the back of the document. The fluorescent lamps 12F, 12B and 13F, 13B illuminate the document. The slit apertures limit the light ray bundles that are imaged by the optical system onto the film, thus limiting any stray reflections that may exist in the imaging station 50 that may cause undesirable artifacts on the photographed image. In an effort to reduce these stray reflections, the imaging station chassis is painted a flat black. The front and back optical axes are offset to prevent document bleedthrough, a condition that allows images from both sides of the document to be superimposed onto each other. This is likely to occur when both sides of the document are being illuminated and photographed simultaneously, and characters from both sides are visible. The offset optical axes along with the slit apertures 14F and 14B and flat black chassis in the imaging station 50 allows documents having a width smaller than the aperture slit width to be photographed. Only light reflected off the document will be imaged by the optical system. Those areas within the slit aperture that do not include the document will appear dark to the optical system and no light is reflected to the film. Therefore, documents of varying widths may be photographed without any adjustments. The visible portion of the front and back of the document are imaged by a system of fixed flat mirrors.

Figure 2:
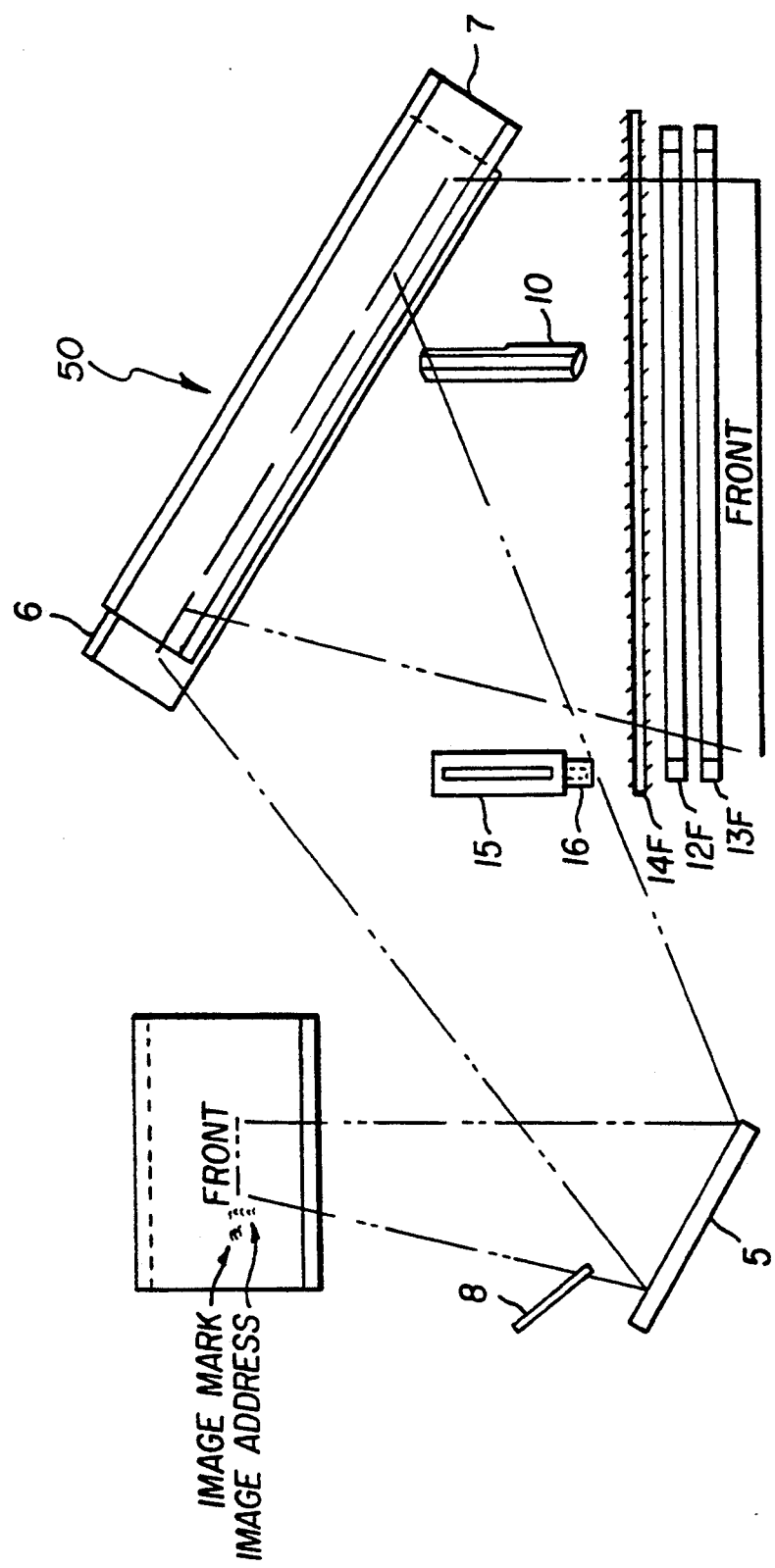
FIG. 2 illustrates the portion of the system that photographs the front of the document.

FIG. 2 illustrates the portion of the optical system that photographs the front of the document and is comprised of cylindrical fluorescent lamps 12F, 13F, slit aperture 14F, image marker 15, image address display 16 and mirrors 5, 6, 7, 8 and 10. The fluorescent lamps 12F and 13F illuminate the front of the document. Mirrors 6, 7 and 5 transmit images of the front of the document through slit aperture 14F to a common path flat mirror, mirror 1. At the same time, mirrors 10 and 8 transmit the image of a marking device called an image marker 15 and an incrementing numerical character display called an image address display 16 to the common path flat mirror 1. The projected images of both the image mark and image address are precisely located along the left edge of the front image of the document.

Figure 3:
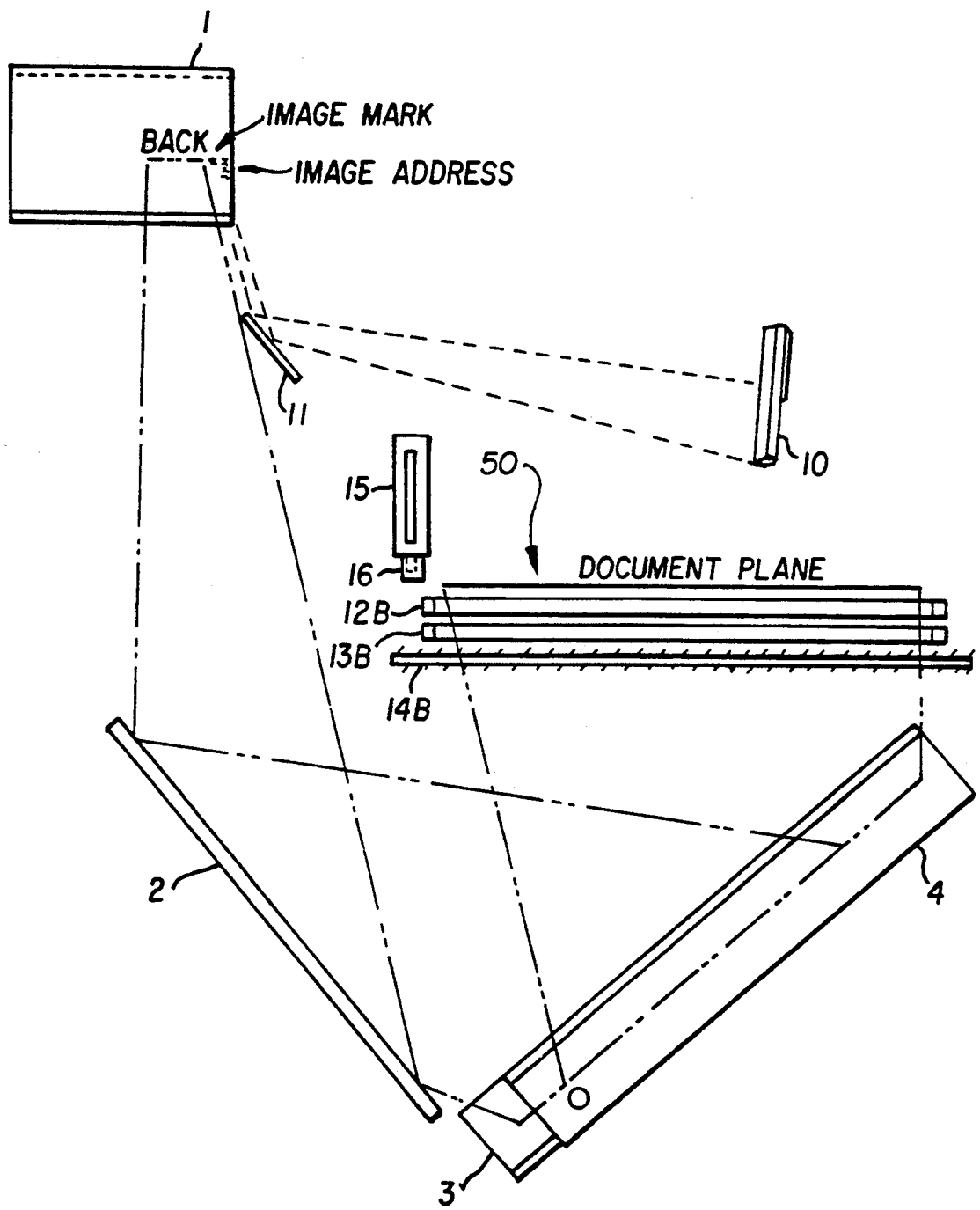
FIG. 3 illustrates the portion of the system that photographs the back of the document.

The portion of the optical system that photographs the back of the document is shown in FIG. 3. It comprises cylindrical fluorescent lamps 12B, 13B, slit aperture 14B, image marker 15, image address display 16, and mirrors 2, 3, 4, 10 and 11. The fluorescent lamps 12B, 13B illuminate the back of the document. Mirrors 2, 3, 4 transmit images of the back of the document through slit aperture 14B to common path flat mirror 1. Mirrors 10 and 11 convey the images of the image marker 15 and the image address display 16 to common path mirror 1. The image mark and image address are precisely located along the right edge of the image of the back of the document. Mirrors 2, 3, 4, 5, 6, 7 are large enough to reflect the image of one side of the largest possible document.

The image mark appears on the film after processing as a very precisely located dark rectangle. It is accurately located at the left and right edges adjacent the images of the front and back of a document, respectively. The rectangle is created by a device, the image marker, that is a brightly illuminated rectangular aperture that is capable of flashing on and off quickly. The same image mark is used by the front and back photographic systems. The rectangular aperture is accurately aligned and imaged next to the image of the front of the document by mirrors 10, 8, 1 and next to the image of the back of the document by mirrors 10, 11 and 1. The alignment of the image mark is critical because it is used by microfilm readers to detect the beginning of each document and its alignment insures the proper alignment of the image address on the film because it is imaged by the same mirrors.

Figure 5:
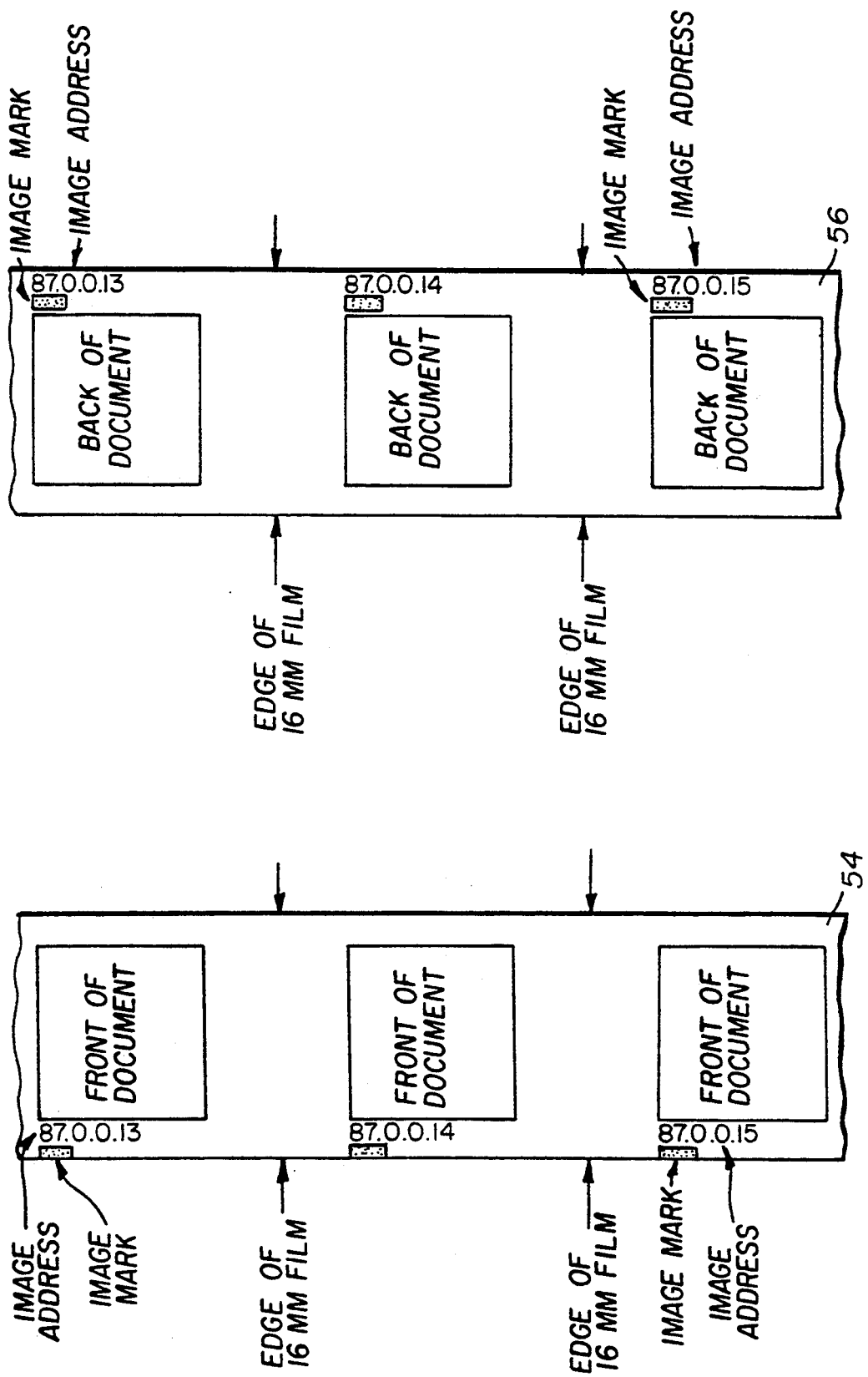
FIG. 5 shows the image format as it would appear on 16 mm format microfilm.

The image address appears on the film adjacent the image as a set of numerical characters that identify each document image. It is located between the image mark and front image of the document and the image of the back and back image mark on the edge of the film (FIG. 5). The numerical code is made up of a constant serial identification (I.D.) number that is created by the operator and a number that is incremented with each document. Therefore, the front and back of each document image can be identified. It is also a common practice that the same numerical code be stamped on the original document as it is being microfilmed by an encoding device (not shown). The numerical characters are created by a device, the image address display, that comprises a PLZT chip that is illuminated by a high intensity lamp. The same image address display is used by the front and back photographic optical paths. Control circuitry (not shown) causes the PLZT to increment the numerical characters as each new document is photographed. It can also become completely dark or invisible to the optical system when an image address is no longer needed.

The front and back photographing optical systems illustrated in FIGS. 2 and 3, respectively, are combined with a common document transport system, not shown, but well known in the art. Also included are the image marker, image address display and mirrors 1 and 10.

Mirror 1 shown in FIG. 1 is the common path mirror and directs the front and back images of the document along with the image marks and image addresses to the camera station 52.

Figure 4:
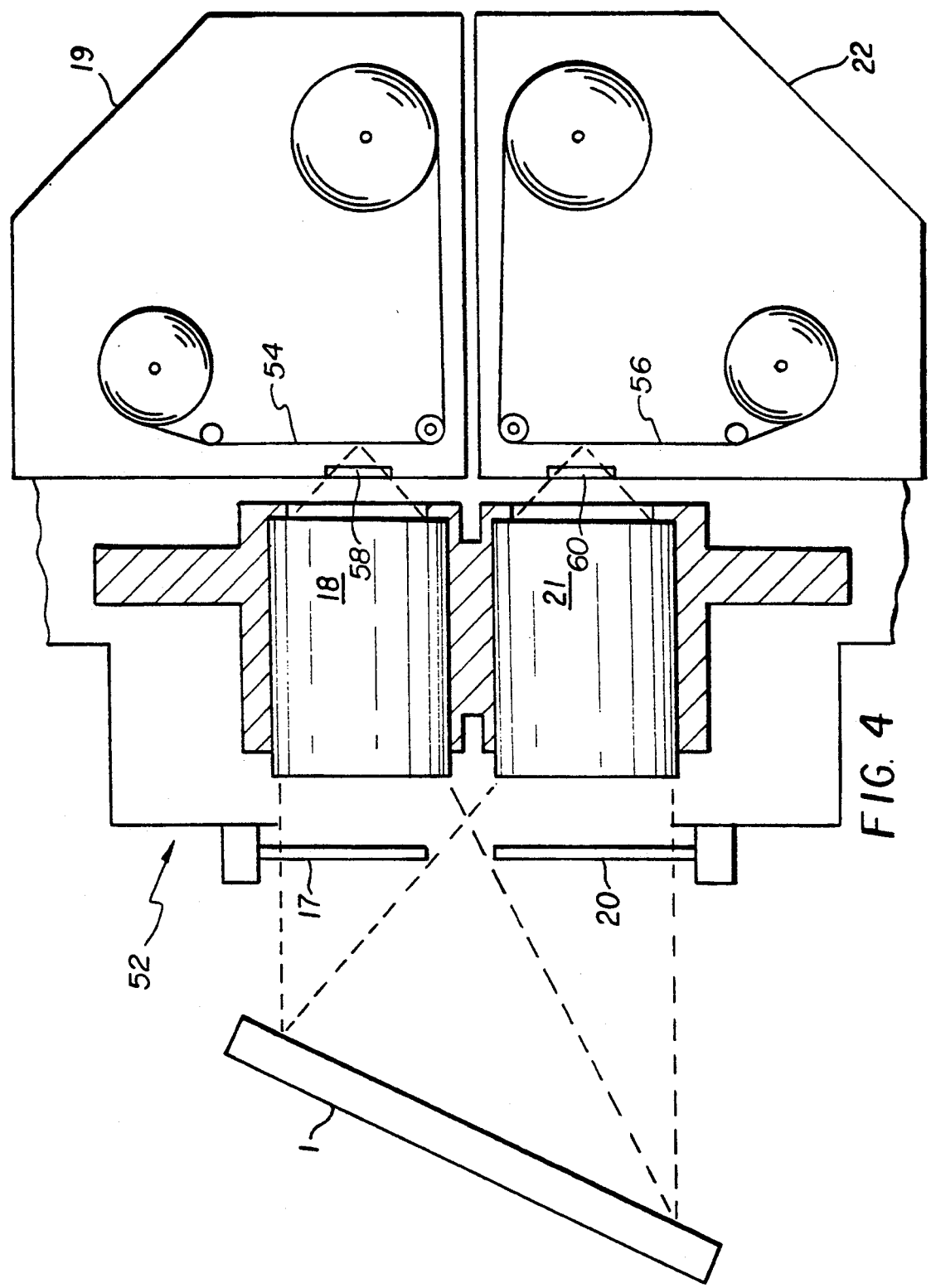
FIG. 4 shows the camera stations.

The camera station 52 is shown in FIG. 4 and is comprised of two shutters 17, 20, two 25× lenses 18 and 21 and two film cassettes 19 and 22. Shutters 17 and 20 remain closed until activated by the document sensor control circuitry (not shown). The shutters are opened when the leading edge of the document is detected, and closed when the document passes through the imaging station 50. Lens 18 images the front image of the document along with the image mark and the image address associated with that document image onto 16 mm format film 54 housed in film cassette 19. Lens 21 images the image of the back of the document along with the image mark and image address associated with that document onto a 16 mm format film 56 housed in film cassette 22. The film cassettes 19 and 22 are precisely located such that both film planes lie very flat in a common imaging plane. The film cassettes 19 and 22 contain shutters 58 and 60 that are opened when cassettes 19 and 22, respectively, are placed in camera station 52. Cassettes 19 and 22 are removed to load or unload film. The camera station 52 also includes the necessary film drive apparatus (not shown) but well known in the art; the film drive is controlled by the document sensor circuitry. The film 54 and 56 is advanced at a mechanical reduction rate equal to that of the optical reduction ratio. In this instance, the film 54 and 56 moves at a velocity 25 times slower than the document moves.

SYSTEM OPERATION

Documents may be fed into the machine manually or placed in a large capacity feeder. The transport system successively presents each document to the imaging station 50, serially in continuous motion as the document is detected by a document sensor. The document sensor control circuitry (not shown) simultaneously opens shutters 17 and 20 and engages the film drive system while actuating the image marker 15 and image address display 16 (see FIG. 1). After a portion of both sides of the document has been photographed, the image marker 15 and image address display 16 are deactivated. Accordingly, the image mark and image address appear along the top portions of the document image. Without this arrangement, the image mark and image address would appear blurred alongside the document image. Each document travels across the slit aperture 14F and 14B where the portion of both sides of the document within the slit opening is photographed. The front of the document is illuminated by cylindrical fluorescent lamps 12F and 13F and imaged onto film 54 through aperture slit 14F. The back of the document is illuminated by cylindrical fluorescent lamps 12B and 13B and imaged on film 56 through aperture slit 14B.

As a document moves through the imaging station, a system of fixed flat mirrors simultaneously transmit images of the front and back of the document through slit apertures 14F and 14B, respectively, to the common path flat mirror 1 (see FIG. 1). Mirrors 7, 6, 5 transmit images of the front of the document to common path mirror 1. Simultaneously, mirrors 10 and 8 transmit the images of the image marker and image address display to the left edge of the front image of the document on mirror 1. The image address counter is incremented as each document is photographed. Mirrors 4, 3, 2 transmit images of the back of the document as each document is photographed via common path mirror 1. In a like manner and at the same time, mirrors 10 and 11 transmit the images of the image marker 15 and the image address display 16 to the right edge of the image of the back of the document on mirror 1. With shutters 17, 20 open, mirror 1 conveys the images of both sides of the document along with the image marks and image addresses to lens 18 and 21. Lens 18 images the front of the document along with its image mark and image address onto 16 mm format film 54 housed in film cassette 19. Lens 21, on the other hand, images the back of the document along with its image mark and image address onto a second roll of 16 mm format film 56 also housed in film cassette 22. When the end of the document is detected, the document sensor control circuitry closes shutters 17 and 20 and disengages the film drive system.

FIG. 5 illustrates the image format as it appears on the processed 16 mm film. Film cassette 19 contains the roll of film 54 with the images of the front side of the documents along with the image marks and image addresses associated therewith. Film cassette 22 contains the roll of film 56 with the images of the back side of the documents along with the associated image marks and image addresses relating to the images.

The system is capable of simultaneously microfilming both sides of a document along with their respective image mark and image address onto two rolls of 16 mm format film 54 and 56 with a reduction ratio of 25× with one roll of film 54 containing all of the images of the document front and the other roll of film 56 containing all of the images of the back of the document. The machine is capable of high speed, large volume microfilming of documents that can be fed into the machine and photographed without interruptions. If desired, a large capacity feeder can be used to minimize operator handling and involvement. The number of documents photographed without interruption is limited only the amount of film on the rolls in the cassettes 19 and 22.

Both sides of the document are recorded on respective rolls of film 54 and 56 and the corresponding images of the front and back are easily mated by their relative position on the film roll and the common numerical address. Both sides of the desired document can be viewed simultaneously on a dual roll retrieval machine or one can use two separate machines placed side by side.

Although the present invention has been described and illustrated in detail, it is clearly understood that the same is by way of illustration and example only and not to be taken by way of limitation. It is clearly understood by those in the field that many film formats and their appropriate reduction ratio may be used. It should be noted that 25× reduction is what is normally used in practice; however, reduction ratios as low as 14× could still be used and accommodate an image of a single side of a standard document (8.5×11) for 16 mm format film. Accordingly, it is intended that the spirit and scope of the present invention be limited only by the terms of the appended claims.

It should be noted that the preferred embodiment of the present invention uses 16 mm format film but the present invention is intended to cover the use of other film formats such as 35 mm to provide even lower reduction ratios. These modifications can be made by those skilled in the art and would involve moving some parts such as mirrors and lenses to accommodate the larger format film such as dual rolls of 35 mm format film which would accommodate reduction ratios as low as 6× for a standard (8.6×11) document.

I claim:

1. In a document photography system for photographing on two rolls of photographic film both front and rear sides, respectively, of rectangular documents traveling serially and end-to-end, said system comprising:

means for conveying documents to be photographed past a camera station and an imaging station;
   a first set of fixed mirrors are aligned to reflect the image of the front side of one of said documents to be photographed to a first reduction lens system;

a second set of fixed mirrors are aligned to reflect the image of the reverse side of the document to be photographed to a second reduction lens system;

said first and second reduction lens systems projecting their respective images onto first and second film surfaces in first and second film rolls;

an advancing means for moving said first and second film surfaces at a synchronous rate with respect to said conveying means for movement of the document past said imaging station at a selectively increased synchronous rate with respect to the movement of the document; and control means operatively connected to said advancing means permitting said first and second film surfaces to be moved at a decreased synchronous rate with respect to the movement of the document.

2. In a document photography system as set forth in claim 1 wherein said system further includes an identifying station having a plurality of identifying members for projecting said identifying data onto said first and second film surfaces adjacent the respective image of the document.

3. In a document photography system as set forth in claim 2 wherein said identifying station further includes image mark means for projecting an image mark onto said first and second film surfaces adjacent the leading edge of the respective image of the document.

4. In a document photography system as set forth in claim 3 wherein said identifying station further includes blipping means for projecting a blip onto said first and second film surfaces adjacent the edge of each respective image of the document.

5. In a document photography system as set forth in claim 4 where said blipping means further includes means for varying the size of the blip to produce a plurality of blip sizes.

6. In a document photography system as set forth in claim 1 wherein the rolls of photographic film take the form of 16 mm format film.

7. In a document photography system as set forth in claim 6 wherein said first and second reduction lens systems are 14× or greater for a standard size document.

8. In a document photography system as set forth in claim 1 wherein the rolls of photographic film take the form of 35 mm format film.

9. In a document photography system as set forth in claim 8 wherein said first and second reduction lens systems are 6× or greater for a standard size document.

* * * * *